Patented Sept. 13, 1949

2,482,075

UNITED STATES PATENT OFFICE 2,482,075

PROCESS FOR THE MANUFACTURE OF RUBBER ARTICLES

Rebecca O. Teston, Glenbrook, Conn., assignor to Eastern Rubber Specialties, South Norwalk, Conn., a corporation of Connecticut No Drawing. Application January 10, 1947, Serial No. 721,448

3 Claims. (Cl. 18—58.6)

This invention relates to the manufacture of rubber articles from dispersions of latex. More particularly, my invention relates to the manufacture of rubber articles through the coagulation of latex upon a form or mold as particularly set forth in the Teague Patent No. 1,719,633 issued July 2, 1929.

In the Teague patent, there is disclosed a process for the manufacture of rubber articles in which a form is coated first with a dispersion of latex and thereafter subjected to the action of a coagulant. After treatment with the coagulant, the form is dipped into a dispersion of latex with the coagulant acting on the dispersion of latex to build up the thickness of rubber on the form. The Teague process yields, so far as I know, a successful and commercially desirable product. However, because of the application of the latex directly to the form, the finished vulcanized product cannot be stripped from the form except with extreme difficulty. Therefore, much time and effort is expended in removing finished articles from the forms, and frequently the finished articles are damaged in the process.

Later workers in this art found that the first coat of latex suggested by Teague could be omitted, and the coagulant applied directly to the form. Thereafter, the form coated with the coagulant may be dipped into a dispersion of latex and the latex coagulated on the form, and then dried. While advantages in speed and economy are claimed for this process, those skilled in the art have found that one of the most important features thereof is the facilitated stripping of the finished product brought about by the presence of the coagulant between the latex and the form.

It has been found in the utilization of the process in which the coagulant is deposited directly on the form, rather than after the application of an initial coating of latex, that it is difficult to obtain a finished article having a smooth outer surface. On the other hand, where the final latex dip is applied to an earlier coating of latex as in the Teague process, the final article has an outer smooth finish that is extremely desirable.

It is the object of the process of this application to yield an article that has a smooth outer finished surface, as contributed by the process of the Teague patent. It is a further object of my process to yield an article that may be stripped very readily from the mold on which it is formed. Those skilled in the art will readily appreciate the considerable value of the contributions thus outlined.

My invention consists broadly in the utilization of a lubricant applied to the form in advance of the first application of latex, or coincidentally with the first application of latex. Thereafter, I follow the procedure of the Teague process. Thus, where the lubricant is applied coincidentally with the first coat of latex, I then treat the latex with a coagulant, following which I dip the form into a dispersion of latex to complete the article. Where the lubricant is applied to the form in advance of the first coat of latex, I then apply a coating of latex over the deposit of lubricant, and then treat the latex with a coagulant and repeat the latex and coagulant dips as many times as necessary to build up the desired thickness.

My invention contemplates further, the use of a gas impervious lubricant that will adhere to the mold and will prevent the formation of gas and air bubbles.

In carrying out my invention, I utilize an inexpensive mold or form which may be of glass, metal, ceramics, plastics, etc., all as those skilled in the art will fully appreciate. In one modification of my process, the form is then dipped into a solution of paraffin in carbon tetrachloride. Any other organic solvent for the paraffin may be used, but I prefer carbon tetrachloride because it is non-inflammable. Preferably, I use between ¾ and 1½ pounds of paraffin to each gallon of carbon tetrachloride, but the concentration of paraffin may vary within considerable limits. After treatment with the lubricant set forth, the mold is allowed to dry through the evaporation of the solvent, as latex will not adhere to the form where there are traces of carbon tetrachloride.

Following the application of the lubricant, the form is then dipped into a dispersion of latex and then into a coagulant. Thereafter, repeated dips may be made in aqueous dispersions of latex and coagulants until the desired thickness is attained. An article manufactured in accordance with the process as outlined, stripped very well and easily from the mold, was soft and smooth in outer feel and appearance, and was generally an exceedingly desirable product. It may be well to say at this point that the coagulant found to work best in the particular process was calcium chloride, but other commercial and well known coagulants including calcium nitrate, may be used with good results.

In a second modification of my process, I use as the lubricant an aqueous dispersion of paraffin, a commercial form of which is known as Ceremul C. This dispersion is applied to the mold and is followed by the application of the first coat of latex. Thereafter, there follows the treatment by the coagulant and then the final latex dip, all as I have already outlined in connection with the utilization of paraffin dissolved in a solvent.

I have used also, in my process, an aqueous dispersion of micro crystalline wax sold under the trade-mark Ceremul M. This product, when used as a lubricant in the process outlined, is extremely effective.

A further lubricant used by me is mutton tallow. In one modification of my invention, the mold is dipped directly into molten mutton tallow, but in another modification of the invention, I utilize a solution of mutton tallow in carbon tetrachloride. Of course, the remaining steps are the same as already indicated above with regard to the paraffin solution.

In a further modified form of my invention, I use as a lubricant a resin. One form of resin I have used successfully is commercially known as Styrax, and when dissolved in alcohol was applied to the mold in the same manner as the lubricants previously discussed by me. The mold together with the coating of Styrax is then coated with a dispersion of latex and treated with a coagulant. Thereafter, the mold may be dipped into an aqueous dispersion of latex, and if desired, repeated coagulant dips and latex dips may follow. The completed articles stripped very easily from the form and it was found that a resin coating remained on the form and allowed the forming of a number of articles on the form before it was necessary to recoat the form with the resin solution.

It will be noted that each of the lubricants set forth is of a gas impervious character and tends to adhere very closely to the form without the forming of gas pockets between it and the form. Moreover, the lubricants used are of such character that the first coating of latex adheres closely thereto and without the forming of gas or air pockets. As a result, the finished latex product is not deformed in any way by gas and air bubbles as in prior processes, and use need not be made of such expedients as discussed in the Newton Patent No. 1,924,214, in which a venting and vapor pervious material is applied to the mold in advance of the latex. Those skilled in the art will appreciate fully the considerable contribution of my invention with regard to this feature alone.

It will be well to emphasize also that a small portion of the lubricant used migrates into the latex applied over the lubricant. This presence of lubricant in the latex seems to prevent hardening and stiffening of the latex on aging, and yields a product having a soft fine feel.

As outlined earlier in this application, I have found it possible to use as the first coating of the mold a dispersion of both a lubricant and latex. In other words, I provide a combined lubricant and latex dip. It seems that in this modification of my invention, a small portion of the lubricant also migrates into the latex during the processing of the article although not to the degree where the lubricant is used alone as the first coating. It does, however, yield substantially the same results as above outlined. Moreover, the lubricant, when used in this manner, did not weaken the finished product. As a lubricant, in this modification of my invention, I have used the aqueous dispersion of paraffin earlier referred to by me as Ceremul C. I have also used the aqueous dispersion of micro crystalline wax referred to by me earlier as Ceremul M. In order to stabilize and prevent coagulation of the latex by the dispersions of the lubricant, I found it well to utilize a wetting agent, and have found Aquarex D, a well known commercial agent, is quite adequate. The concentration of Aquarex D used should vary directly with the concentration of the latex. A suggested formula that I have found effective is as follows:

| | Parts |
|---|---|
| 10–15% aqueous solution of Aquarex D | 12 |
| Ceremul C or Ceremul M | 4 |
| Latex | 1–4 |

It should be emphasized at this point that the amount of latex may be varied within considerable limits, the more latex that is used, the heavier will be the completed article. In preparing the combined lubricate and latex dip, the Aquarex D solution was first added to the dispersion of paraffin or wax and mixed well, the latex being then slowly added while stirring. After application of the combined lubricant and latex solution, the mold is dipped in a coagulant, after which there follows the dip into an aqueous dispersion of latex. In connection with this modification of my invention, I have found that the coagulant that was most effective was calcium chloride in water solution. However, I did determine that when using the dispersion of paraffin and latex, the coated mold could be dipped into a coagulant formed from a coagulant dissolved in alcohol and acetone.

I believe that those skilled in the art will now fully understand the nature of my invention and the manner in which it may be practiced.

I now claim:

1. The process of forming hollow rubber articles such as dolls that comprises coating a mold with a gas impervious lubricating film in solid form having that quality which aids stripping the finished rubber article from the mold while preventing the forming of gas bubbles between it and the mold or the latex dispersion thereafter applied to said gas impervious lubricating film, said coating being extremely thin so as not to affect appreciably the outer detail of the mold surfaces and the resulting detail of the hollow rubber article, coating said mold thereafter with a coagulable dispersion of latex, then subjecting the latex to the action of a coagulant to form the hollow article with the coagulated latex adhering to the coated mold without the formation of air bubbles therebetween, and then stripping the completed article from said mold while said gas impervious lubricating film is present in solid form between said mold and article to facilitate the stripping of the article from the mold.

2. The process of forming hollow rubber articles such as dolls that comprises coating a mold with a gas impervious lubricating film in solid form having that quality which aids stripping the finished rubber article from the mold while preventing the forming of gas bubbles between it and the mold or the latex dispersion thereafter applied to said gas impervious lubricating film, said coating being extremely thin so as not to affect appreciably the outer detail of the mold surfaces and the resulting detail of the hollow rubber article, coagulating on said coated mold a coagulable dispersion of latex to form the hollow article, and then stripping the completed article from said mold while said gas impervious lubricating film is present in solid form between said mold and article to facilitate the stripping of the article from the mold.

3. The process of forming hollow rubber articles such as dolls that comprises coating a mold with a gas impervious lubricating film in solid form having that quality which aids stripping the finished rubber article from the mold while preventing the forming of gas bubbles between it and the mold or the latex dispersion thereafter applied to said gas impervious lubricating film, said coating being extremely thin so as not to affect appreciably the outer detail of the mold surfaces and the resulting detail of the hollow rubber article, coagulating on said coated mold a coagulable dispersion of latex to form the hollow article, then stripping the completed article from said mold while said gas impervious lubricating film is present in solid form between said mold and article to facilitate the stripping of the article from the mold, and with a substantial portion of the gas impervious lubricating film remaining on the form after the stripping of the article so that the said form may be used in the process thereafter without immediate recoating with a new gas impervious lubricating film.

REBECCA O. TESTON.

REFERENCES CITED

The following references are of record in the file of this patent:

UNITED STATES PATENTS

| Number | Name | Date |
| --- | --- | --- |
| 1,876,229 | Herzog | Sept. 6, 1932 |
| 1,887,190 | Twiss | Nov. 8, 1932 |
| 2,207,815 | Ogilby | July 16, 1940 |
| 2,283,238 | Thompson | May 19, 1942 |